United States Patent [19]
Parkinson et al.

[11] Patent Number: 5,508,609
[45] Date of Patent: Apr. 16, 1996

[54] MONITORING APPARATUS FOR DETECTING AXIAL POSITION AND AXIAL ALIGNMENT OF A ROTATING SHAFT

[75] Inventors: James R. Parkinson; Herbert F. Gee, both of Vergennes, Vt.

[73] Assignee: Simmonds Precision Product Inc., Akron, Ohio

[21] Appl. No.: 85,860

[22] Filed: Jun. 30, 1993

[51] Int. Cl.$^6$ .............................. G01B 7/30; G01B 7/14; G01D 21/02; G08C 19/08
[52] U.S. Cl. .................. 324/207.25; 324/207.24; 33/661; 340/870.3
[58] Field of Search .................. 324/207.22, 207.24, 324/207.25, 207.15, 207.16, 207.23, 209, 243, 175; 73/862.325, 862.331; 340/870.31, 870.3; 33/661, 655, 626; 250/231.13; 356/138

[56] References Cited

U.S. PATENT DOCUMENTS

| | | | |
|---|---|---|---|
| 3,190,125 | 6/1965 | Holz | 73/432 |
| 3,307,164 | 2/1967 | Zimmer | 324/207.13 |
| 3,538,762 | 11/1970 | Parkinson et al. | 73/136 |
| 3,548,649 | 12/1970 | Parkinson | 73/136 |
| 3,641,535 | 2/1972 | Knopf | 340/195 |
| 3,827,807 | 8/1974 | Fletcher et al. | 356/141 |
| 3,863,235 | 1/1975 | McKee et al. | 340/195 |
| 3,876,326 | 4/1975 | Weitz | 415/17 |
| 4,033,042 | 7/1977 | Bently | 33/181 R |
| 4,199,718 | 4/1980 | Ikeda et al. | 324/207.25 |
| 4,488,443 | 12/1984 | Parkinson | 73/862.33 |
| 4,518,917 | 5/1985 | Oates et al. | 324/207 |
| 4,590,806 | 5/1986 | Lutton et al. | 73/862.34 |
| 4,627,724 | 12/1986 | Cameron | 356/141 |
| 4,630,033 | 12/1986 | Baker | 340/347 P |
| 4,737,709 | 4/1988 | Loftus | 324/208 |
| 4,746,859 | 5/1988 | Malik | 324/208 |
| 4,764,767 | 8/1988 | Ichikawa et al. | 340/870.31 |
| 4,810,965 | 3/1989 | Fujiwara et al. | 324/207.25 |
| 4,833,405 | 5/1989 | Richards et al. | 324/208 |
| 4,899,596 | 2/1990 | Janik et al. | 73/862.33 |
| 4,924,180 | 5/1990 | Nasr et al. | 324/207.15 |
| 5,086,272 | 2/1992 | Hinrichsen | 324/207.13 |
| 5,182,953 | 2/1993 | Ellinger et al. | 73/862.335 |
| 5,192,862 | 3/1993 | Rudd, III | 250/227.21 |
| 5,228,349 | 7/1993 | Gee et al. | 73/862.336 |
| 5,313,845 | 5/1994 | Hayashi et al. | 324/209 |

FOREIGN PATENT DOCUMENTS

| | | |
|---|---|---|
| 0287214A2 | 3/1988 | European Pat. Off. . |
| 0443514A3 | 2/1991 | European Pat. Off. . |
| 2637960 | 3/1977 | Germany . |
| 3311945C2 | 10/1984 | Germany . |
| 231633A1 | 1/1986 | Germany . |
| 3908248A | 9/1990 | Germany . |
| 58-111719 | 7/1983 | Japan . |
| 59-13906 | 1/1984 | Japan . |
| 62-42009 | 2/1987 | Japan . |
| 62-44603 | 2/1987 | Japan . |
| 1391713 | 8/1972 | United Kingdom . |
| 1303994 | 1/1973 | United Kingdom . |
| 2062875 | 5/1981 | United Kingdom . |
| 2079467 | 1/1982 | United Kingdom . |
| 2105475 | 3/1983 | United Kingdom . |
| 2181246 | 10/1985 | United Kingdom . |

OTHER PUBLICATIONS

Derwent Abstract for European Patent Application No. 84-081129/13.
Welsh *An angular displacement transducer* J. Phys. E. Sci Instrum., vol. 13, 1980, pp. 826–828.

*Primary Examiner*—Sandra L. O'Shea
*Assistant Examiner*—Roger Phillips
*Attorney, Agent, or Firm*—Leonard L. Lewis; Richard A. Romanchik

[57] ABSTRACT

Axial alignment detection apparatus for a shaft rotatable about an axis includes alignment indicating means rotatable by the shaft and comprising a plurality of detectable elements; and detector means for detecting the elements and alignment of the shaft as a function of the elements; the elements comprising at least one reference element and at least one alignment dependent element, wherein the reference and alignment elements have a detectable alignment dependent relationship to each other.

37 Claims, 7 Drawing Sheets

MONITORING APPARATUS FOR DETECTING AXIAL POSITION AND AXIAL ALIGNMENT OF A ROTATING SHAFT

BACKGROUND OF THE INVENTION

The invention relates generally to position and alignment detection apparatus and methods for rotatable equipment. More particularly, the invention relates to axial displacement and alignment detection apparatus and methods for rotatable shafts, and especially coupled shafts.

As is well known, in most rotatable equipment applications in which there is a coupling between two rotatable elements, axial alignment and displacement are important factors that can affect the life of the equipment and operating efficiency of the system. Ideally, of course, coupled rotatable elements such as shafts, for example, are aligned collinearly on a common axis of rotation to minimize the forces applied to the shafts, couplings and load bearings. However, near perfect and constant alignment is difficult if not impossible to achieve in actual day to day operation of such equipment. A certain amount of axial displacement or float is usually designed into a system, and flexible couplings between shafts are commonly used to compensate for shaft misalignment. Shaft misalignment can be caused by numerous factors such as human error when assembling the system components, bearing wear, thermally induced expansion and contraction of the shaft and bearing assemblies, load variations, settling of foundations that support heavy machinery, and so on to name just a few.

Shaft misalignment can be generally categorized into three types: 1) axial displacement in which a shaft is displaced in a direction parallel to the shaft axis of rotation; 2) angular displacement or skewing in which a shaft is not parallel with a desired axis of rotation, or in which two coupled shafts have nonparallel axes of rotation; and 3) parallel or offset displacement in which two shafts have axes of rotation that are not collinear even if they are parallel. Of course, these three general types of axial misalignments can occur in various combinations or all together. Furthermore, two coupled shafts may exhibit relative axial displacement between the shafts.

As an example, a gas turbine engine may be used to turn a drive shaft that is flexibly coupled to a driven shaft that in turn is coupled to a load such as a generator. A coupling shaft may be interposed between the drive shaft and the driven shaft. Misalignment of the shafts can cause excessive wear of the bearings, can apply excessive loads and torque to the shafts, and generally will decrease the operating efficiency of the system.

Although various mechanical features such as flexible couplings can be used to compensate for shaft misalignment, it is desirable that the shaft positions be monitored or else the couplings can be damaged.

Axial displacement of a shaft is relatively easy to detect. For example, U.S. Pat. No. 4,833,405 issued to Richards et al. shows a dual sensor arrangement for detecting teeth axially spaced on a rotating shaft. Phase differences between the sensor signals can be used to indicate axial displacement. However, this arrangement is susceptible to false readings caused by angular and/or offset displacement. As a result, the arrangement is unsuitable for systems in which shaft misalignment other than simple axial displacement occurs; and is particularly unsuitable for systems that utilize coupled shafts. This arrangement also depends on accurate and fixed positioning of the sensors relative to the shaft sensible elements. The need for two sensors also increases the cost of the overall apparatus, and is further hampered by the need to arrange the sensors in such a manner as to prevent mutual inductance between the sensors.

Angular and offset misalignments are more difficult to detect due to the lack of an easily identified reference alignment. Consequently, shaft angular and offset alignment detectors commonly use variations in magnetic coupling strength caused by distance variations between two magnetically or inductively coupled elements. This general approach, however, is susceptible to noise because the alignment information is amplitude encoded in the detector signals. Furthermore, these apparatus can produce false readings due to axial displacement of one or more of the shafts.

The need exists, therefore, for position and alignment detection apparatus and methods that are simpler and less costly than known arrangements, and which can detect angular, offset and/or axial displacement each independent of the other types of misalignment (or compensated therefore), and which can detect relative displacement between two coupled shafts. Such apparatus and methods should also be usable in combination with a calibration and set-up procedure to align shafts in a system.

SUMMARY OF THE INVENTION

In view of the aforementioned needs and shortcomings of known shaft position and alignment detection devices, the present invention contemplates axial alignment detection apparatus for a shaft rotatable about an axis comprising alignment indicating means rotatable by the shaft and comprising a plurality of detectable elements; and detector means for detecting the elements and alignment of the shaft as a function of the elements; the elements comprising at least one reference element and at least one alignment dependent element, wherein the reference and alignment elements have a detectable alignment dependent relationship to each other.

The invention also contemplates the methods embodied in the use of such apparatus, as well as a method for detecting angular alignment of a shaft rotatable about an axis comprising the steps of:

a. rotating with the shaft a plurality of detectable elements with at least one element being a reference and at least one other element being alignment dependent and disposed at an angle with respect to the reference element;

b. producing outputs from a plurality of transducers disposed about the shaft wherein each transducer output has a characteristic that corresponds to detection of the reference and alignment elements as they pass by the transducer; and c. combining the transducer outputs to detect alignment of the shaft relative to a reference alignment.

These and other aspects and advantages of the present invention will be readily understood and appreciated by those skilled in the art from the following detailed description of the preferred embodiments with the best mode contemplated for practicing the invention in view of the accompanying drawings.

BRIEF DESCRIPTION OF THE DRAWINGS

FIG. 3 (parts A, B and C) is a simplified illustration of suitable teeth arrangements for the detection apparatus of FIG. 1, and also showing typical signals that can be produced by sensors detecting the teeth;

DETAILED DESCRIPTION OF THE INVENTION

Figure 1:
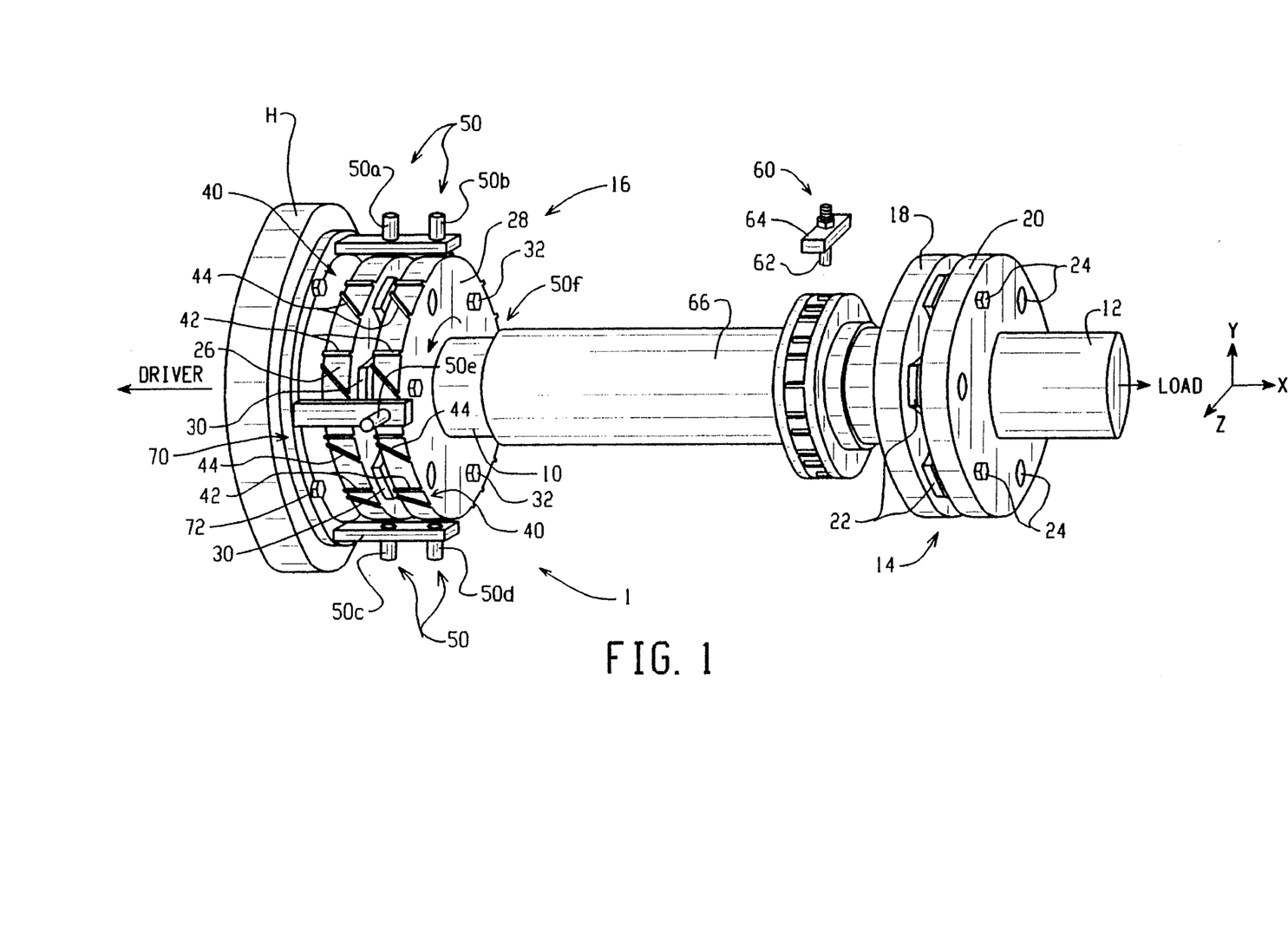
FIG. 1 is a schematic perspective of a rotatable shaft position and alignment detection apparatus illustrated in an exemplary manner for use with coupled shafts.

With reference to FIG. 1, there is illustrated in a simplified exemplary manner a shaft position and alignment detection apparatus 1 according to the present invention. In the example illustrated schematically in FIG. 1, different aspects and embodiments of the invention are incorporated into an overall monitoring system for various dynamic properties of rotatable equipment. Those skilled in the art will readily appreciate that the invention contemplates not only the integration of all these features into a total sensor system as shown in FIG. 1, but also the use of various individual subparts in any number of combinations as is convenient depending on the particular application. Therefore, the description herein of the overall system and specific use should not be construed in a limiting sense as to the various and numerous improvements and advantages of the invention.

In addition, although the invention is described herein with respect to specific examples of rotatable shaft alignment detection apparatus and procedures, and particularly for coupled shafts and engine driven shafts, these examples are merely for convenience and ease of understanding and are not intended to embody any specific limitation as to the scope and use of the invention. The various features of the invention have application to a wide range of rotatable equipment applications and shaft alignment situations, whether with respect to a single shaft or two or more coupled shafts, and regardless of the type of mechanism used to turn the shafts or the loads driven by the shafts. The particular mechanisms used to couple shafts as described herein are also a matter a design choice and form no particular aspect or limitation of the invention.

In FIG. 1 then, a drive shaft 10 is coupled to a driven shaft 12 by a suitable coupling assembly 14. The driven shaft 12, of course, can be coupled to another shaft or to a load device such as a generator, for example (not shown.) The drive shaft is coupled to an engine power plant such as a gas turbine engine or other suitable means to turn the shaft as desired (not shown.) The power plant typically includes a housing H with an end plate or other suitably rigid structure that can support sensors used with the invention. The sensors do not have to be mounted to the power plant, however, a separate structure could be provided to support the sensors about the shafts.

The drive shaft 10 is coupled to the power plant by a second coupling assembly 16, which can conveniently but not necessarily be similar in construction to the first coupling assembly 14. In this embodiment, the coupling assemblies 14,16 are flexible disk couplings which include a plurality of disks sandwiched between two hub assemblies. For example, the first coupling assembly 14 includes first and second hubs 18,20 and a plurality of flexible disks 22 which are axially stacked. The disks couple the shafts together so as to transmit torque from the drive shaft to the driven shaft, while at the same time permitting relative movement between the coupled shafts 10,12 both axially and nonaxially to compensate for shaft misalignments. The hubs 18,20 are secured together by a plurality of bolts 24. Half of the bolts 24 secure the disk stack to one hub and the other half of the bolts secure the disk stack to the other hub.

The second coupling 16 can be similarly constructed as the first coupling. Hence, the second coupling 16 includes first and second hubs 26 and 28 with stacked plates 30 sandwiched therebetween with the coupling assembly held together by bolts 32. The first hub 26, of course, is mounted to the engine drive with torque transmitted to the drive shaft 10 via the plates 30 and second hub 28.

Each hub of the second coupling 16 is provided with a plurality of teeth or sensible elements 40. These teeth are preferably made of a ferromagnetic material such as, for example, AISI 4340 or AMS 6260. The teeth 40 include a plurality of reference teeth 42 which in the exemplary embodiment of the drawings herein are aligned generally parallel with the rotational axis of the shafts 10,12. The teeth 40 also include a plurality of position dependent alignment teeth 44. Those skilled in the art will readily appreciate, however, that the reference teeth can be oriented in any suitable manner, and in fact the term "reference teeth" is simply used for ease of explanation and clarity. Either set of teeth can be considered the "reference" for purposes of the invention. More generally, the invention contemplates that the teeth have a position dependent relationship that can be detected as the shafts rotate. It will also be noted that in the exemplary embodiment described herein, the teeth 40 are equally spaced about the entire circumferential perimeter of the hubs. However, this is primarily done to simplify the electronics required for sensing the teeth and to improve the accuracy of the apparatus. Depending on the particular application of the invention, the number of teeth used and their position about the hubs is largely a matter of design choice.

A particular advantage of the embodiment described in this case, however, is that the reference teeth and the position dependent teeth commonly mounted on a single hub (such as hub 28 for example) can be detected by a single sensor as the hub turns with its associated shaft.

The shaft position and alignment detection apparatus 1 includes the teeth 40 and a plurality of sensors 50 selectively positioned about the periphery of the hubs so as to detect the teeth 40 as the teeth rotate with their associated hub and shaft. In the exemplary embodiment of FIG. 1, there are two sensors 50a and 50b disposed at the top of the shaft assembly with the first sensor 50a aligned to detect the teeth on the first hub 26. The second sensor 50b is aligned to detect the teeth on the second hub 28. Diametrically opposite these two sensors are two additional sensors 50c and 50d. The third sensor 50c detects the same teeth as the sensor 50a, and the fourth sensor 50d detects the same teeth as the sensor 50b. Preferably, these four sensors 50a–d all lie in a common plane that is generally vertical (such as the XY plane for example), although this orientation is not required for use of the invention. The vertical alignment is useful for detecting shaft misalignment out of the horizontal (for example, the XZ plane) plane of the shafts. As an example, the second and fourth sensors 50b and 50d can be used to detect angular misalignment of the drive shaft 10 with respect to the engine drive. Such angular misalignment could be manifested for example due to an angular displacement or rotation of the drive shaft 10 in the XY plane such that the axis of rotation of the drive shaft is no longer horizontal.

It is important to keep in mind that the description herein of rotational displacements and misalignments as well as reference alignments are simply examples and are not to be construed in a limiting sense. An important aspect of the invention is that shaft axial position and misalignment (whether angular or offset) can be detected with respect to any reference position and direction that the designer may choose. Also, the use of the teeth on the coupling and specifically the hubs is but one example of where the teeth and sensors can be disposed. The teeth can be disposed for example directly on the shaft or a shaft sleeve if desired.

Only two sensors (such as sensors 50a and 50c or 50b and 50d) are needed to detect shaft misalignment in a plane that is transverse to the plane that the sensors lie in. The reason that four sensors are shown in the vertical plane for FIG. 1 is that sensors 50a and 50b can be used together to detect relative axial displacement between the two hubs 26 and 28, as will be more fully described hereinafter. Sensors 50c and 50d can also be used for the same purpose. All four sensors can be used for detecting relative axial displacement in such a manner that the displacement information is independent of shaft misalignment. Again, the number of sensors used and their position and use will depend on what alignment and displacement information is to be extracted from use of the apparatus of the invention.

As shown in FIG. 1, the sensors 50 also include a pair of horizontally and diametrically disposed sensors 50e and 50f (note that in FIG. 1 the sensor 50f is not in view.) These sensors can be used to detect angular misalignment out of the vertical XY plane.

Each of the sensors 50 is preferably of the type that produces an output signal that corresponds to detection of the teeth as they rotate past the sensor. For example, the sensors 50 may be monopole variable reluctance sensors that produce an electrical output signal that is a function of flux variation in the sensor induced by using ferromagnetic material for the teeth 40. Such monopole sensors are well known and described in U.S. Pat. Nos. 4,488,443; 3,876,326 issued to Parkinson; Weitz respectively, which patents are commonly owned by the assignee of the present invention and the entire disclosures of which are fully incorporated herein by reference. Of course, many different types of sensors can be used. For example, magneto-optic sensors can be such as described in U.S. Pat. No. 5,192,862 issued to Rudd and commonly owned by the assignee of the present invention, the entire disclosure of which is fully incorporated herein by reference. Alternatively, optical sensors could be used with optically reflective material on the teeth. These are but a few of the many types of sensors and teeth that can conveniently be used with the invention.

Although not shown in FIG. 1, the sensors 50 are connected to an electronic circuit that processes the sensor output signals to determine the desired information relating to axial misalignment and displacement.

Also shown in FIG. 1 is a monopole torque sensing assembly 60. This torque sensing assembly may be of the type shown and described in U.S. Pat. Nos. 3,548,649 and 5,182,953 issued to Parkinson and Ellinger et al. respectively, or in U.S. patent application Ser. No. 07/584,173 filed on Sep. 18, 1990 for "Composite Power Shaft With Intrinsic Parameter Measurability", which are commonly owned by the assignee of the present invention, the entire disclosures of which both are fully incorporated herein by reference. A detailed description of the operation of the torque sensing assembly 60 is provided in the incorporated disclosures and thus need not be repeated herein. It should be noted, however, that the torque sensor assembly 60 conveniently can be configured with a sensor 62 that is the same in construction as the sensors 50. Of course, any one or more of the sensors 50,62 can be different in design from the other sensors if so desired for a specific application. The sensor 62 can be mounted to a supporting structure (not shown) with a bracket 64 or other suitable means. As explained in the referenced disclosures, the torque sensing assembly 60 includes a reference sleeve rigidly attached to one end of the shaft whose torque is being detected, to provide a reference point for the torque sensor. A temperature sensor (not shown) can also be provided to detect the shaft temperature for compensating the torque readings because shaft deflection varies in relation to the temperature of a shaft under torsional stress.

Figure 2:
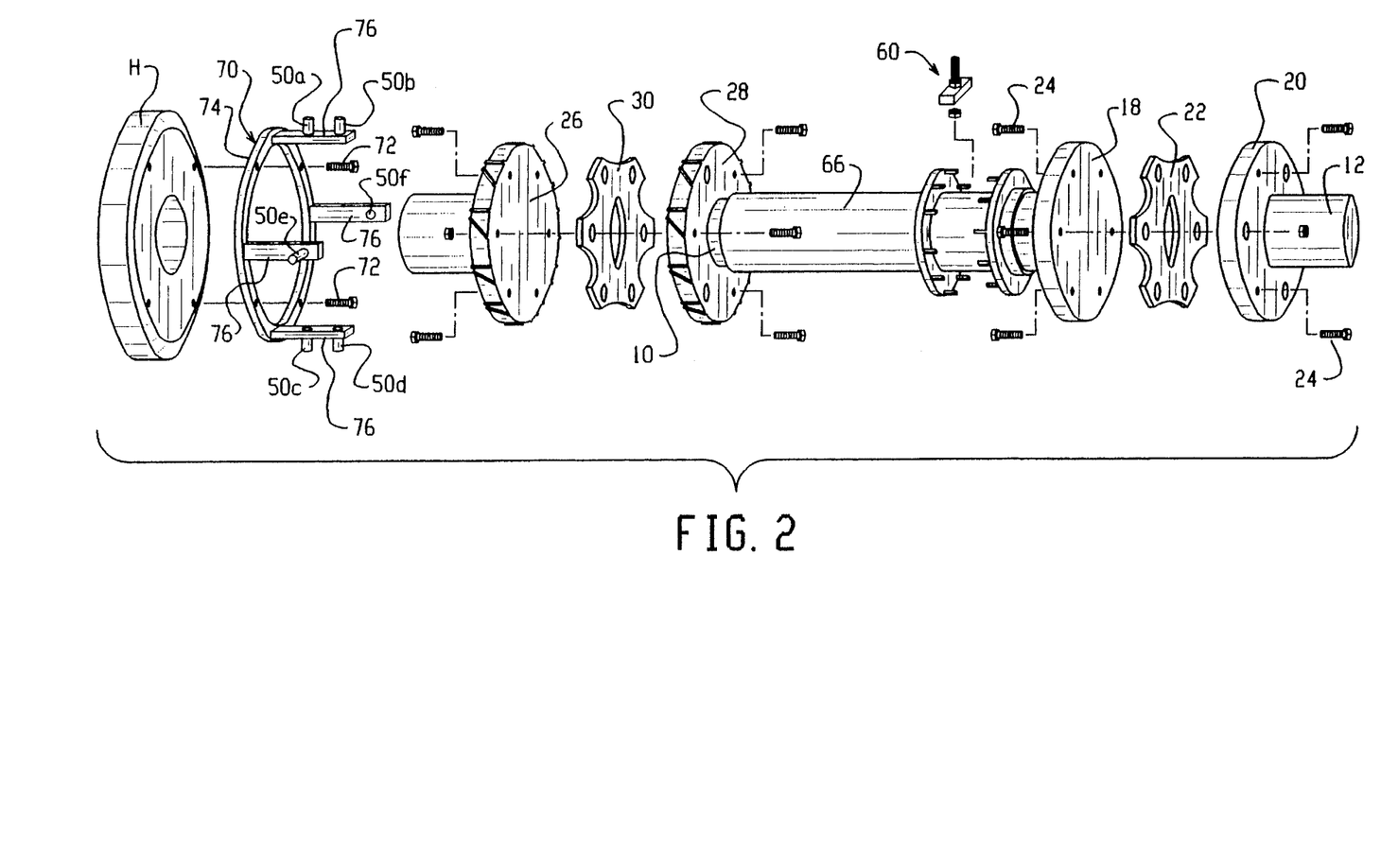
FIG. 2 is an exploded view of the exemplary arrangement shown in FIG. 1.

With reference to FIG. 2, the sensors 50 can conveniently be mounted on a bracket assembly 70 that is attachable to the power plant frame housing H by any suitable means such as bolts 72. The bracket assembly 70 includes a frame 74 and a plurality of axial extensions 76 that are suitably positioned such that when the assembly 70 is mounted on the housing, the sensors 50 are positioned in such a manner as to detect the corresponding teeth 40 that rotate past the sensors.

As illustrated in FIGS. 1 and 2, the reference and position dependent teeth 40 have a predetermined relationship with respect to the rotation axis of the shafts such that displacement or misalignment of the shafts due to axial displacement, skewing or offset can be detected by the sensors 50. Rotational speed information is also detectable. The various sensors 50 operate to detect the teeth 40 in the same basic manner with preferably similar output signal parameters, thus simplifying the signal processing requirements. Therefore, a general description of the sensor/teeth detection approach follows next, then a more detailed description of how the sensors can be arranged and operated to obtain the desired dynamic characteristics of the rotating members will be presented herein.

Figure 3A:
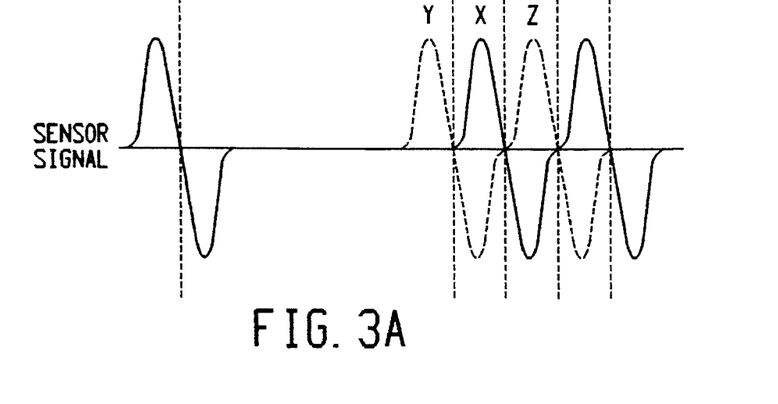

With reference to FIG. 3, I show in a simplified manner a suitable tooth arrangement in which, for example, the reference teeth 42 are generally aligned with the rotational axis of its associated shaft, and the alignment teeth 44 are positioned at an angle with respect to the reference teeth. Preferably, but not necessarily, the teeth 42,44 are spaced around the periphery of the hub to which they are attached. The alignment teeth also preferably do not extend more than half of the distance between successive reference teeth. This arrangement simplifies the signal processing but is not essential for realizing the benefits of the present invention.

Figure 3B:
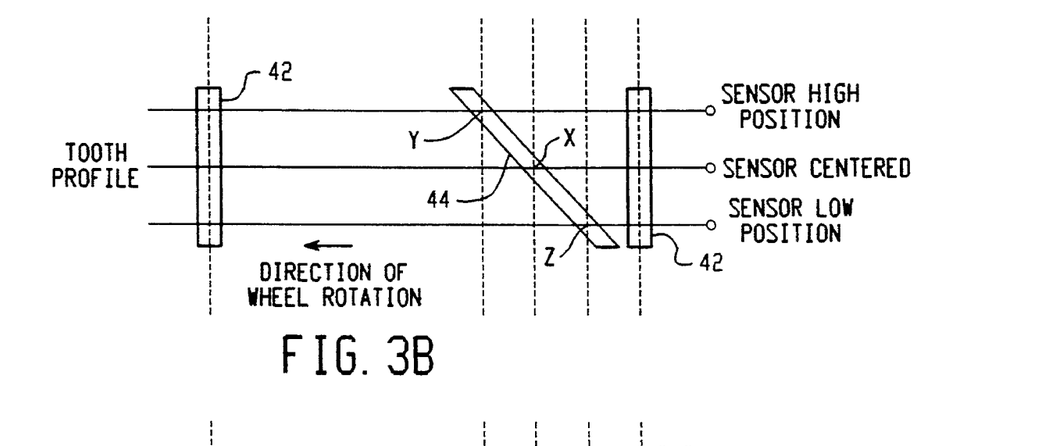
Figure 3C:
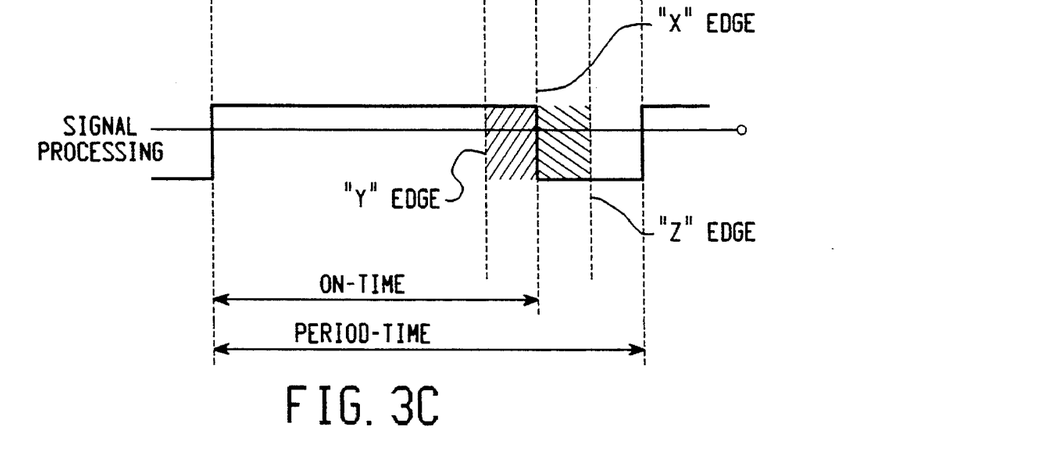

In FIG. 3B, there is shown two reference teeth 42 and an alignment tooth 44. In this drawing, the direction of hub rotation is in a horizontal direction. Assume now that the teeth are made of a ferromagnetic material and that a monopole sensor 50 is disposed so as to be centered (as at X) between the axial ends of the teeth 40 (which in FIG. 3B would be the top and bottom of the teeth.) In such a case, a same monopole variable reluctance sensor produces a generally sinusoidal signal as it detects the passing reference and alignment teeth. The sensor output signal goes through a zero as each tooth center passes by the sensor. By using a zero crossing detector in the signal processing circuitry (FIG. 3C), the sensor output signal can be conveniently converted to a digital type signal that has an "on/off" or "high/low" ratio that is a function of the position of the sensor with respect to the teeth 40. For example, of the sensor is not centered, but rather is positioned near the top (as at Y) of the teeth in FIG. 3B, then the on/off ratio will change compared to the ratio when the sensor is centered with respect to the teeth. The ratio also changes if the sensor is positioned near the bottom (as at Z) of the teeth in FIG. 3B. Note that in this example, the on/off ratio is a ratio of the time period from a reference tooth to the alignment tooth, divided by the total time period between two successive reference teeth. Thus, a simple sequential pulse ratiometric detection of the on/off ratio corresponds to the change in position of the sensor with respect to a reference position of the sensor. The reference position of the sensor of course can easily be determined by the initial sensor output signal, or can be set to a specific value during calibration. As also shown in FIG. 3C, the digital signal can further be processed by converting it to a DC voltage that corresponds to the time period ratio information. Of course, those skilled in the art will recognize that many different signal processing schemes can be used for determining the sensor position variation as a function of the spacing between the teeth, particularly depending on the degree of accuracy desired and the type of sensor output signal that is produced.

It can be noted at this time, that any of the sensors used in the apparatus of FIG. 1 can be used to detect the rotational speed of the corresponding shaft, because the total period time between reference teeth zero crossing points (FIG. 3A and 3C) corresponds directly to the rotational speed. Furthermore, the signals produced by the sensors, for example variable reluctance sensors, can be used to develop power supply voltage and current if desired.

Figure 4:
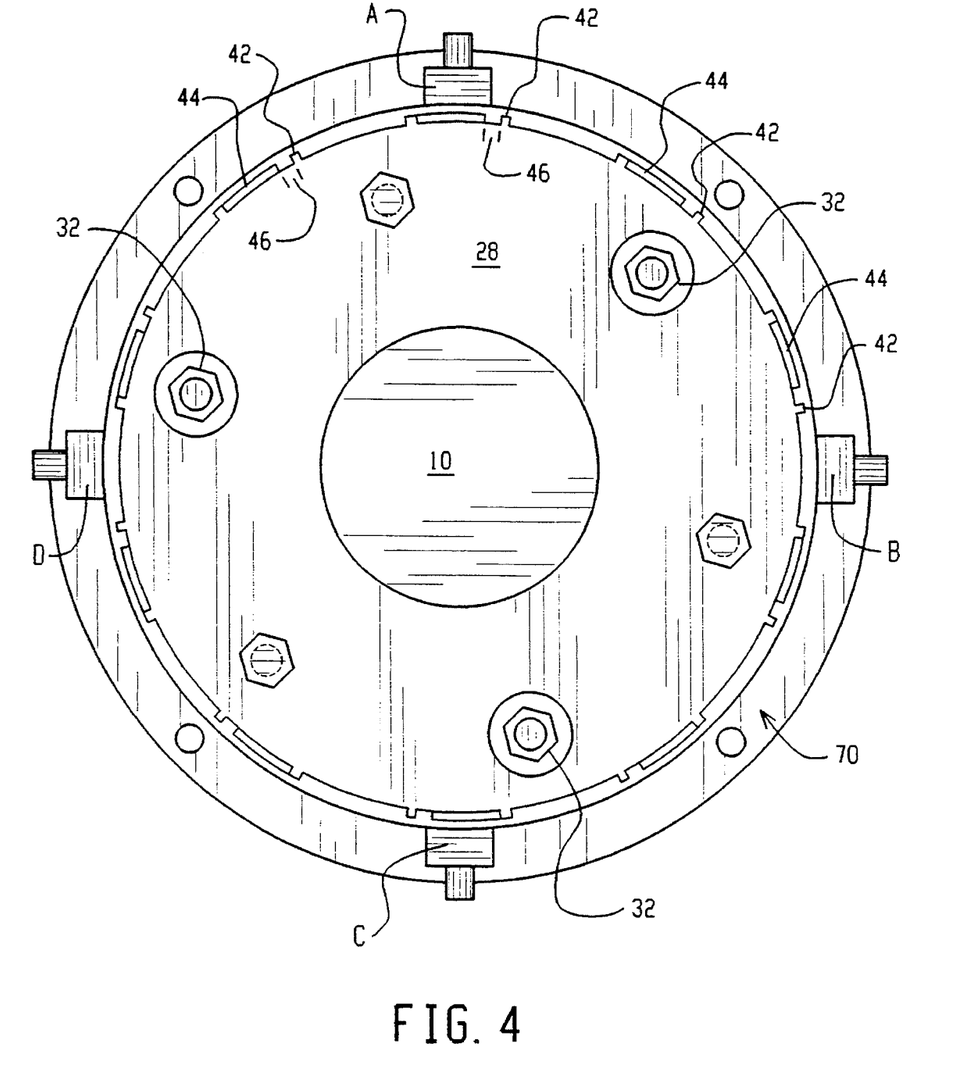
FIG. 4 is an end view in elevation of one of the hubs showing the teeth and sensor arrangements in one embodiment of the invention.

With reference next to FIG. 4, in the example embodiment described herein, there are four sensors A, B, C, and D arranged in quadrature about the hub periphery in sufficiently close proximity to the teeth 40 that the teeth can be detected as they rotate past the sensors. Each sensor has output conductors or other suitable means, of course, to connect or couple the sensors to a signal processing circuit, as will be described shortly. As shown in FIG. 4, sensors A and C are disposed in a vertical plane (in a manner similar to sensors 50*b* and 50*d* in FIG. 1), while sensors B and D are disposed generally in a horizontal plane (in a manner similar to sensors 50*e* and 50*f* in FIG. 1.) Note again that the alignment teeth 44 are disposed within half of the distance between successive reference teeth 42, although as previously noted the invention can be implemented in other tooth configurations. Further note that each alignment tooth end that is proximate a reference tooth is spaced from the reference tooth by a gap 46. This gap helps assure that the reference signals can be discriminated from the position dependent signals by the signal processing circuitry.

With further reference to FIGS. 3 and 4, it will be noted that each sensor A, B, C and D can be used individually to detect axial displacement of the shaft from a reference position. This is because axial displacement causes a corresponding change in the time that it takes for the position dependent tooth to pass by the sensor after a reference tooth passes by the sensor, but the time period for two successive reference teeth to pass by the sensor remains the same (assuming a constant speed of rotation.) By using the sequential pulse time period ratiometric technique described herein, the variable speed of the shaft is automatically factored in to the positional measurements.

Although axial displacement is thus relatively easy to determine, angular or offset alignment changes of the shaft will cause erroneous readings. This arises, of course, from the fact that such axial misalignments also cause corresponding changes in the time periods detected for the position dependent teeth to pass the sensors with respect to the reference teeth periods.

In accordance with an important aspect of the invention, the axial displacement measurements can be compensated for axial misalignments by combining the output signals from two or more of the sensors 50. With reference to FIGS. 1 and 4, it is noted, for example with respect to the horizontally disposed sensors, that an angular (skew) change in the shaft alignment in the XY plane does not change the timing period ratio for the horizontal sensors. However, for the vertically disposed sensors, such a skewing causes equal and opposite changes in the on/off ratio for the two sensors respectively. In other words, a skew in the XY plane will cause one of the sensors to detect the alignment tooth sooner in time compared to the reference position, while the other vertical sensor detects the alignment tooth later in time. This time domain offset that occurs will be equal in magnitude for each sensor but one sensor will detect a positive change and the other a negative change. The significance of this phenomena is that if the corresponding sequential pulse ratios of the two sensor signals are added together, then the combined signal corresponds to axial displacement of the shaft independent of the angular misalignment. Furthermore, if the sequential pulse ratios are subtracted from one another then the combined signal corresponds to the angular displacement information independent of axial displacement effects. This arises from the fact that axial displacement causes two diametrically opposed sensors to detect equal shifts in the on/off ratio that are also equal in direction of the shift (i.e. not equal and opposite shifts but rather equal and in the same direction shifts.)

In a similar manner, when the horizontally disposed sensors 50*e* and 50*f* sequential pulse ratios are added together, the combined signal corresponds to axial displacement of the shaft independent of angular misalignment in the XZ plane, and if the sequential pulse ratios are subtracted the combined signal corresponds to the angular misalignment independent of the axial displacement.

In accordance with other important aspects of the invention, it should be noted that the shaft alignment and position information can be determined independent of the amplitude of the signals produced by the sensors in response to the passing teeth. Furthermore, the information can be extracted from each sensor output signal independent of its phase relationship to any other sensor's output signal. In other words, the invention does not depend on the absolute positions of the sensors with respect to each other because the relative phases of the signals is not the parameter of interest, but rather simply the time period ratios with respect to reference values. In fact, two oppositely disposed sensors can be rotationally offset up to nearly a full separation distance between reference teeth without significantly affecting the accuracy of the invention. In contrast, prior techniques that depended on phase relationships between sensor signals are highly sensitive to actual rotational positioning of the sensors with respect to each other and the sensible elements.

Although axial position alignment and compression measurements in this embodiment of the invention do not utilize phase relationships between sensor signals, such information can be extracted for useful purposes: for example, episoidal motion (orbiting) monitoring. With reference to FIG. 4, by using the pulses corresponding to the passage of reference teeth by sensors D and B, a direct measurement of vertical location of shaft 10 is achieved. Reference pulses produced by sensor D are used to drive a multivibrator to the high state and reference pulses from sensor B restore the multivibrator to the low state. With shaft 10 rotating counterclockwise, for example, an upward vertical movement of the shaft 10 (towards sensor A for example) will reduce multivibrator on time ratio while a downward vertical movement of the shaft 10 will increase multivibrator on time ratio. Using sensors A and C, in a like manner, will provide an accurate measurement of shaft 10 horizontal excursion. Absolute location of the shaft 10 can be determined at a frequency equal to the number of reference teeth times RPM.

Although the embodiment described herein is for the use of two sensors to detect angular misalignment out of a plane that is transverse to the plane of the sensors, with four sensors being used in quadrature to detect vertical and horizontal misalignments, the four sensor outputs could be combined vectorially to determine total shaft position and displacement within a predetermined envelope. Furthermore, only three sensors are needed to obtain this information, although the use of four sensors simplifies the signal processing electronics.

With reference again to FIG. 1, the invention also contemplates use of the sensors 50 to detect relative axial displacement between coupled rotatable members, such as the shaft 10 and the engine drive. Note that each of the top sensors 50*a* and 50*b* can individually detect axial displacement of its respective rotatable member. If both rotatable members are displaced in the same direction then both sensors will detect an equal positive or negative change (the sign of the change being dependent on the direction of the axial shift) in the time period ratio. However, if there is a relative axial displacement then the sensors will detect different time period ratio changes. This may occur, for example, if there is a compression between the shafts at the coupling 16. Thus, the difference of the output signals corresponds to the relative axial displacement. Also, the relative displacement information can be determined independent of angular and offset misalignments by utilizing the information collected from sensors 50*c* and 50*d* (summation of equal and opposite changes caused by such misalignments).

It should be noted that the determination or detection of relative axial displacement in accordance with the invention can be performed between any rotatable elements whether they are coupled together, operating at different rotational speeds or aligned on different rotating axes. This is because the invention provides position information relative to a reference sensor location independent of rotational speed and signal frequency. This is a significant advantage over prior systems that are dependent on relative phase relationships between two or more sensors.

Figure 5:
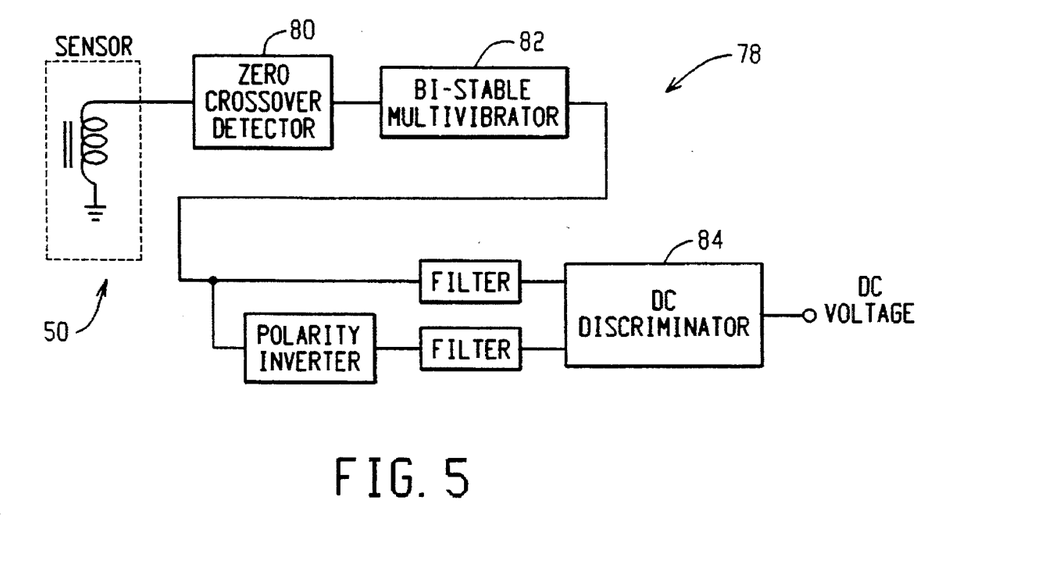
FIG. 5 is an electrical schematic diagram for a sensor output signal processing circuit suitable for use with the present invention in an embodiment that uses variable reluctance sensors.

With reference now to FIG. 5, I show a schematic diagram of a circuit 78 suitable for use with variable reluctance type devices used for the sensors 50. The circuit 78 of FIG. 5, of course, can be the same design for each sensor. The sensor 50 is connected to a zero crossover detector 80 that produces a trigger pulse or other suitable signal that triggers a bistable multivibrator 82. In the example described herein, when a reference tooth passes by the sensor the output of the multivibrator 82 is logic high, and when the position dependent tooth passes by the sensor the output of the multivibrator is reset low. This arrangement is of course just exemplary—many different signal processing schemes can be used. The multivibrator 82 output is then filtered and converted to a DC voltage level, using a discriminator 84, that corresponds to the ratio of high to low time periods for the multivibrator output. This DC voltage thus corresponds, as described hereinbefore, to the actual position of the sensor relative to the sensible teeth 40.

Figure 6:
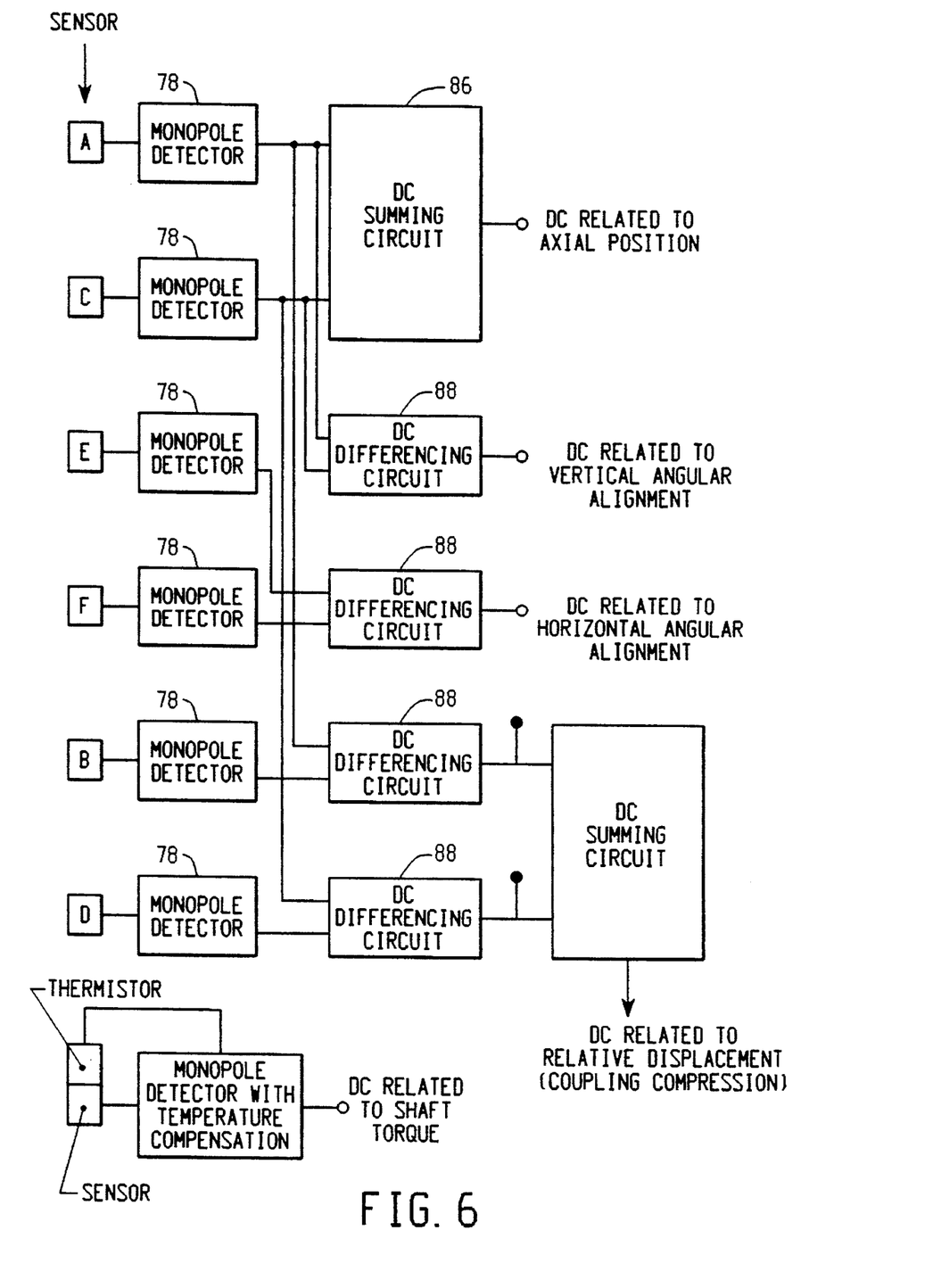
FIG. 6 is an electrical schematic diagram for a signal processing circuit suitable for use with the present invention which combines output signals from several sensors as arranged, for example, in FIG. 1 for determining different dynamic characteristics of a rotatable system.

With reference next to FIG. 6, I show an electrical schematic for a signal processing circuit that combines the output signals of the several sensors illustrated in FIG. 1 to produce signals that correspond to axial displacement and alignment each independent of the other, as well as the compression and torque information if desired. Each of the sensors A–F is connected to a discriminator circuit similar to the circuit 78 shown in FIG. 5. The outputs of these circuits are in turn connected to summing and differencing circuits 86,88 so as to produce the desired information. For example, when the signals that correspond to the sensors 50*b* and 50*d* are summed the result is a signal that corresponds to axial displacement independent of the axial alignment. When the same signals are subtracted from each other, the result is a signal that corresponds to the angular alignment independent of the axial displacement. Note that the output signals from the sensors used for detecting the axial compression information (sensors 50*a* and 50*b* in FIG. 1) are further combined in order to produce compression related signals that are independent of angular misalignment. As also shown in FIG. 6, temperature compensated torque measurements from the torque sensor 62 can also be included in the signal processing circuit.

Figure 7:
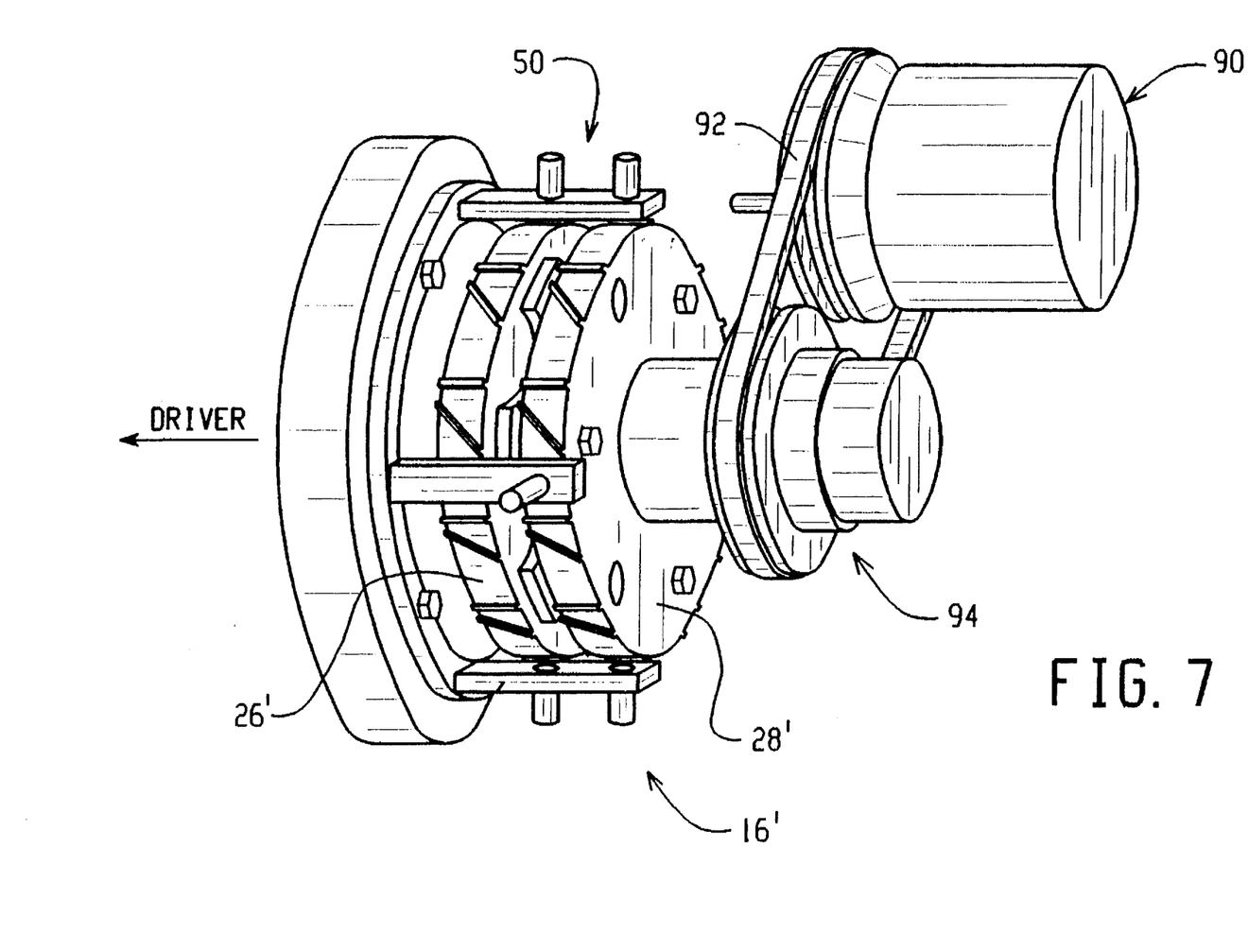
FIG. 7 illustrates in perspective an application of the invention for calibration and set-up of a rotatable system using a calibration replica of a coupling used in normal operation.

With reference next to FIG. 7, a significant advantage of the invention is the inherent capability to perform an alignment procedure that can be used in conjunction with the routine set-up procedure for the equipment being monitored. Rotating equipment such as the engine driver, shafts and load of FIG. 1 typically require a preoperating alignment procedure to set-up the equipment. Shaft alignments are important, of course, for optimizing efficiency and reducing damage and wear of the shafts, bearings and couplings. However, after the equipment is running for a time, temperature and vibration can result in realignment. Therefore, in the field, equipment is typically set-up in such a manner that the effects of temperature in particular cause the equipment to realign during operation hopefully into a properly aligned condition. This set-up alignment however is often done by line of sight or other methods using calculated thermal growth predictions. More importantly, once the operator believes the equipment is aligned, the equipment is usually closed up and run, with no way to determine if in fact the equipment shifted into alignment or is maintaining alignment without having to shut the equipment down. Such steps are very costly and therefore impractical.

As part of the set-up procedure, however, the invention provides a way to determine an optimal alignment condition before the load is connected, then to monitor the alignment during operation of the equipment to verify that in fact the equipment came into proper alignment during operation. This technique can be realized, for example, by connecting a rotatable replica to a coupling assembly 16. An electric motor 90 can be linked to a drive spindle 91 by a drive belt 92 and pulley arrangement 94. The motor can be used to turn the hubs 26', 28' so that initial sensor readings can be taken to establish zero position and alignment calibration references. Then, the replica in FIG. 7 is disconnected from the system and the actual load and driven shafts set-up according to the desired set-up procedure. Once the equipment is up and running, the operator can monitor, on a real time basis if desired, the sensor outputs to observe how the alignment is changing, and whether the equipment shifts into the expected proper alignment. This information is readily available because the sensor outputs provide information as to axial compression, displacement and alignment, each independent of the other.

Figure 8:
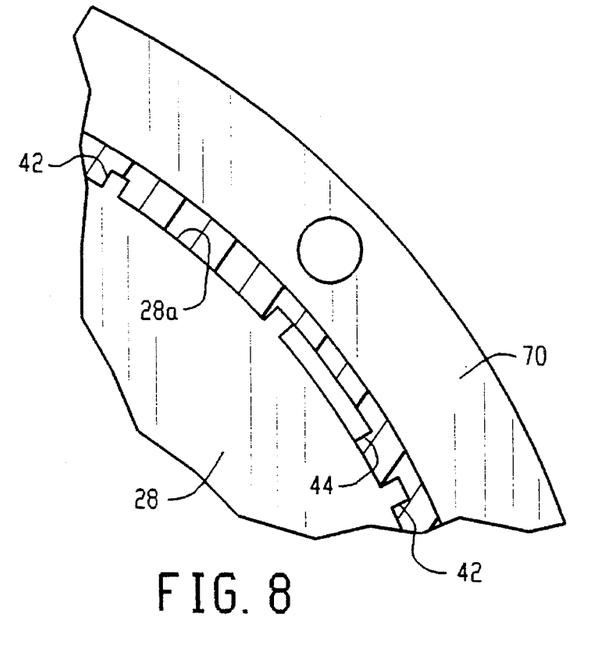
FIG. 8 is an end plan view of a tooth/hub arrangement for reduced windage.

With reference next to FIG. 8, I show a useful feature for use when the teeth 40 extend above the surface perimeter 28a of the hubs 26,28 (in FIG. 8 only one hub is shown for clarity.) In such a case, a cover 94 can be provided over the teeth, such a cover being for example, a layer of plastic, composite or other suitable material that provides a smooth outer surface 96 to reduce windage otherwise caused by the rotating teeth, as well as to protect the teeth if desired.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. Axial alignment detection apparatus for a shaft rotatable about an axis comprising: a plurality of detectable elements disposed on a perimeter rotatable by the shaft; and a plurality of detector means radially spaced from said perimeter for detecting said elements and for producing therefrom outputs that one combined to indicate axial position and axial alignment of the shaft; said elements comprising at least one reference element and at least one axial position and alignment dependent element, wherein said reference and alignment elements have a detectable axial position and alignment dependent relationship to each other.

2. The apparatus according to claim 1 wherein said reference element and alignment dependent element are disposed radially equidistant from the rotation axis such that said elements sequentially pass by said detector means when the shaft turns, said reference element being disposed substantially parallel to the rotation axis and said alignment dependent element being disposed at an angle with respect to said reference element along a coextensive portion of the axial length of the shaft.

3. The apparatus according to claim 2 wherein said reference and alignment dependent elements are both disposed radially in an alternating manner about the rotation axis along said portion of the shaft.

4. The apparatus according to claim 1 wherein said detector means detects axial displacement and angular alignment of the shaft.

5. The apparatus according to claim 1 wherein said detector means comprises a plurality of transducers positioned about the shaft to detect said elements as said elements rotate with the shaft.

6. The apparatus according to claim 5 wherein each of said transducers produces a pulsed output comprising alternating reference and position pulses, the reference pulse period being a function of the shaft rotational speed, and the position pulse period being a function of shaft rotational speed and shaft alignment.

7. The apparatus according to claim 6 wherein a ratio of said position pulse period to said reference pulse period corresponds to alignment of the shaft.

8. The apparatus according to claim 7 wherein each said transducer pulsed output provides a reference and alignment pulse relationship that corresponds to axial displacement of the shaft.

9. The apparatus according to claim 5 wherein a pair of said transducers are disposed diametrically about the shaft; each of said transducers producing pulsed outputs comprising alternating reference and alignment pulses with a detectable relationship between said reference pulses and said alignment pulses such that said relationship corresponds to alignment of the shaft with respect to a reference alignment.

10. The apparatus according to claim 9 wherein a sum of said transducer pair outputs corresponds to axial position of the shaft and a difference of said transducer outputs corresponds to angular alignment of the shaft in a plane perpendicular to a plane said transducer pair is disposed in.

11. The apparatus according to claim 10 wherein a second pair of transducers are disposed diametrically about the shaft at an angle from said first transducer pair, said second transducer pair detecting angular alignment of the shaft in a plane perpendicular to a plane said second transducer pair is disposed in.

12. The apparatus according to claim 11 wherein said first and second transducer pairs are disposed about the shaft orthogonally such that each transducer is separated by 90 degrees of shaft rotation from its adjacent transducers.

13. The apparatus according to claim 10 wherein said sum of said transducer pair outputs is independent of shaft angular alignment in said perpendicular plane, and said difference of said transducer pair outputs is independent of shaft axial position.

14. The apparatus according to claim 12 wherein each transducer is a variable reluctance transducer and said elements are magnetically permeable.

15. The apparatus according to claim 1 wherein each transducer is a magneto-optic transducer and said elements are magnetically permeable.

16. The apparatus according to claim 1 wherein each transducer is an optic transducer and said elements are optically reflective.

17. The apparatus according to claim 1 further comprising torque sensing means of the type having first and second detectable torque sensing elements respectively connected to axially separated portions of the shaft for rotation therewith such that relative movement between said elements corresponds to torque applied to the shaft.

18. The apparatus according to claim 17 further comprising temperature compensation means for said torque sensing means as a function of the shaft operating environment temperature.

19. The apparatus of claim 1 wherein said elements are disposed circumferentially about the shaft and are detected in a plane that is generally parallel to the shaft rotational axis with said detector means radially facing said elements.

20. The apparatus of claim 1 wherein each of said detector means detects said elements across a respective gap, each of said detector means producing an output characteristic substantially independent of said gap.

21. Apparatus for detecting relative axial movement between two rotatable members, comprising: a first plurality of detectable elements rotatable with the first member, a second plurality of detectable elements rotatable with the second member, first detector means for detecting said first elements and axial position of the first member as a function of said first elements, and second detector means for detecting said second elements and axial position of the second member as a function of said second elements; said first and second detector means producing first and second outputs respectively the difference of which corresponds to relative axial movement of the members independent of torque between the first and second members.

22. The apparatus of claim 21 further comprising means for compensating said first and second outputs for angular alignment of each member respectively.

23. The apparatus of claim 21 wherein said first elements comprise a first reference element and a first axial position dependent element, said second elements comprise a second reference element and a second axial position dependent element, said first elements being disposed radially equidistant about the first member and said second elements being disposed radially equidistant about the second member, said reference elements being generally aligned with the rotation axis and each said axial position dependent element being disposed at an angle with respect to its corresponding reference element.

24. The device of claim 23 wherein said first elements are disposed along a mutual axial portion of the first member and said second elements are disposed along a coextensive axial portion of the second member.

25. The apparatus of claim 24 wherein said first detector means produces an output having a characteristic that corresponds to axial position of the first member and said second detector means produces an output having a characteristic that corresponds to axial position of the second member, such that the difference between said output signals corresponds to relative axial movement of the members.

26. The apparatus of claim 24 wherein said first and second members can rotate at different speeds and about different rotational axes.

27. The apparatus of claim 21 wherein said first plurality of detectable elements are disposed on a perimeter about the first member, said second plurality of detectable elements are disposed on a perimeter about the second member, and said first and second detector means are radially spaced respectively from said first and second plurality of detectable elements.

28. The apparatus of claim 27 wherein each of said first and second detector means detects its respective plurality of detectable elements across a respective gap, each of said detector means producing an output characteristic substantially independent of said gap.

29. A method for setting up rotatable equipment for axial alignment and position detection, comprising the steps of:

a. coupling a detector replica for rotation with a drive mechanism, the replica including a plurality of sensible elements; at least one of the elements being a reference element and another element being disposed at an angle with respect to the reference element;

b. producing outputs from a plurality of monopole sensors disposed to detect the detector replica elements as they rotate past the sensor;

c. combining the sensor outputs to detect alignment characteristics;

d. replacing the detector replica with a detector operable with a rotatable member driven by the drive mechanism; and e. detecting realignment of the rotating equipment using the sensor outputs as compared to the sensor outputs when the detector replica was used.

30. The method of claim 29 wherein said replica is used to calibrate the sensors for a predetermined alignment condition.

31. A method for detecting alignment of a shaft rotatable about an axis comprising the steps of:

a. rotating with the shaft a plurality of detectable elements disposed on a perimeter about the shaft with at least one element being a reference and disposed generally parallel with the rotation axis, and at least one other element being alignment and position dependent and disposed at an angle with respect to the reference element;

b. producing outputs from a plurality of transducers disposed about the shaft, wherein each transducer is radially spaced from said perimeter and produces an output that has a characteristic that corresponds to detection of the reference and alignment elements as they pass by the transducer; and c. combining the transducer outputs to detect axial position and alignment of the shaft relative to a reference.

32. The method of claim 31 wherein the step of combining the transducer outputs is used to detect axial position of the shaft relative to a reference position.

33. The method of claim 31 wherein the step of combining the transducer output signals includes the step of subtracting the signals to detect angular alignment independent of axial displacement of the shaft.

34. The method of claim 32 wherein the step of combining the transducer output signals includes the step of adding the signals to detect axial displacement of the shaft relative to a reference and independent of angular alignment of the shaft.

35. The method of claim 34 wherein the elements are detected using variable reluctance of a transducer by using magnetically permeable elements.

36. The method of claim 34 wherein the elements are used to modulate a magnetic field associated with magneto-optic transducers.

37. The method of claim 34 wherein the relative axial displacement detected includes axial compression at a coupling.

* * * * *